(12) United States Patent
Hendriks et al.

(10) Patent No.: US 8,661,074 B2
(45) Date of Patent: Feb. 25, 2014

(54) ADAPTIVE CHOICE FOR CONTEXT SOURCE REQUEST

(75) Inventors: Jozef Henricus Petrus Hendriks, Tilburg (NL); Erik Jan Reitsma, Zoetermeer (NL); Hugo Zwaal, Breda (NL); Mieke Verheijen, Berchem (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 629 days.

(21) Appl. No.: 12/439,987

(22) PCT Filed: Sep. 5, 2006

(86) PCT No.: PCT/NL2006/050219
§ 371 (c)(1),
(2), (4) Date: Jun. 15, 2010

(87) PCT Pub. No.: WO2008/030081
PCT Pub. Date: Mar. 13, 2008

(65) Prior Publication Data
US 2010/0268760 A1   Oct. 21, 2010

(51) Int. Cl.
*G06F 15/16* (2006.01)
(52) U.S. Cl.
USPC .......................................... 709/203; 709/204
(58) Field of Classification Search
USPC ................................................. 709/203, 204
See application file for complete search history.

(56) References Cited

U.S. PATENT DOCUMENTS

| | | | | |
|---|---|---|---|---|
| 5,748,850 A | * | 5/1998 | Sakurai | 706/50 |
| 6,519,580 B1 | * | 2/2003 | Johnson et al. | 706/47 |
| 6,973,459 B1 | * | 12/2005 | Yarmus | 707/778 |
| 7,366,108 B2 | * | 4/2008 | Szentesi et al. | 370/254 |
| 7,565,403 B2 | * | 7/2009 | Horvitz et al. | 709/206 |
| 2004/0039786 A1 | * | 2/2004 | Horvitz et al. | 709/207 |
| 2004/0054726 A1 | | 3/2004 | Doss et al. | |
| 2004/0162894 A1 | * | 8/2004 | Griffin et al. | 709/223 |
| 2006/0028995 A1 | * | 2/2006 | Canoy et al. | 370/252 |
| 2006/0291580 A1 | * | 12/2006 | Horvitz | 375/265 |
| 2008/0005055 A1 | * | 1/2008 | Horvitz | 706/62 |
| 2009/0052327 A1 | * | 2/2009 | Larsson et al. | 370/238 |
| 2009/0228769 A1 | * | 9/2009 | Vityaev | 714/793 |
| 2010/0220613 A1 | * | 9/2010 | Hendriks et al. | 370/252 |
| 2010/0268760 A1 | * | 10/2010 | Hendriks et al. | 709/203 |

FOREIGN PATENT DOCUMENTS

| | | |
|---|---|---|
| EP | 1 298 527 A | 4/2003 |
| EP | 1 526 457 A | 4/2005 |

OTHER PUBLICATIONS

Dey A K: "Providing Architectural Support for Building Context-Aware Applications" Internet Citation, [Online] Nov. 2000, XP002188154.

\* cited by examiner

*Primary Examiner* — Adnan Mirza (57) ABSTRACT

Method and service node (10) for providing a service in a communication network (1). The service node (10) is arranged to evaluate a request comprising an expression (A), a function of multiple elements. The elements (eventually) relate to data originating from context sources (B, D, E) available in the communication network (1). Each of the one or more context sources (B, D, E) has an associated context source weight for a query by the service. The context source (E) for which evaluation of the expression has a lowest expression evaluation weight is determined, based on the associated context source weights, and this context source (E) is interrogated first.

28 Claims, 3 Drawing Sheets

ADAPTIVE CHOICE FOR CONTEXT SOURCE REQUEST

TECHNICAL FIELD

The present invention relates to a method for providing a service in a communication network, in which the service comprises evaluating a request comprising an expression, the expression being a function of a plurality of elements, each element relating to data originating from one or more context sources available in the communication network.

In a further aspect, the present invention relates to a service node for a communication network.

BACKGROUND

Currently when a context source provides information to a requestor in a communication network, this is e.g. done by request based mechanisms. After a request has been done every context source needs to be interrogated for the actual information at that moment. The programmer of the service application determines in which order the context sources are interrogated.

SUMMARY

The present invention seeks to provide an improvement in network performance for a communication network providing a service involving multiple context sources.

According to the present invention, a method according to the preamble defined above is provided, in which each of the one or more context sources has an associated context source weight for a query by the service, the method comprising determining the context source from the one or more context sources for which evaluation of the expression has a lowest expression evaluation weight, based on the associated context source weights, and interrogating first the context source determined to have the lowest expression evaluation weight. The function is e.g. a boolean function, which only provides a positive evaluation of the request when all elements are true. By first requesting the context source having the lowest expression evaluation weight, the other context sources need not be interrogated when the first one provides a false result of the request. Due to not further querying of other context sources in the expression, lower total cost, and lower network and context source load, etc. are obtained. Furthermore, the method allows to automatically update the order of interrogating the context sources due to changing circumstances during operation of the service. Again, this will provide a more flexible execution of the present method with more efficiency.

In a further embodiment, the expression comprises one or more intermediate expressions, and the method further comprises iteratively determining the weight of evaluating intermediate expressions, until all elements relate only to data originating from the one or more context sources. In this manner, the lowest weight intermediate expression towards each of the context sources may be determined for each expression until the expression elements comprise only context sources, at which point the context source to be interrogated first has been determined.

The method may further comprise taking into account the distribution of possible values of the data originating from the one or more context sources when determining the lowest expression evaluation weight. Such information is usually known beforehand, can be estimated, or can be derived from historical data, and may result in better efficiency.

In a further embodiment, the context source having the lowest associated context source weight is determined to have the lowest expression evaluation weight. This embodiment may not provide the overall lowest expression evaluation weight, but resources are saved for evaluating the entire expression.

The associated context source weight is, in a further embodiment, a function of network resource use, actual monetary cost, or a combination of network resource use and actual monetary cost.

The data of each of the plurality of context sources is in a further embodiment stored in an associated proxy server, which is directly accessible for the service. Use of a proxy server or proxy may facilitate the possibilities of making data available to applications in the network, and provide a quicker access to these data.

In a further embodiment the expression is a boolean function, the data from each of the context sources being true or false. This allows a quick evaluation of the expression by the service. In an alternative embodiment, the data from the context sources is a numeric value, and the expression comprises a function of the values of the context sources. This allows easier interfacing with the context sources, as context sources may already be present or available in the network, but only provide numerical values.

The data from each of the context sources may in a further embodiment also have the value unknown. The method may further be arranged to deal with a value of unknown returned by a context source, e.g. depending on the kind of expression which is evaluated (e.g. a boolean AND or OR function). In an even further embodiment, the method further comprises to use a latest obtained value for the respective context source value if the value is unknown. In both embodiments, efficiency related to the service (e.g. the use of network resources and monetary cost) is further improved.

In an even further embodiment, a child expression is used by multiple parent expressions, and the weight for evaluating the child expression is shared between the multiple parent expressions when the associated requests are received simultaneously. This provides a further opportunity to improve the efficiency for the service in the network.

In a further aspect, the present invention relates to a service node for a communication network providing a service in the communication network, in which the service node is arranged to receive and evaluate a request, the request comprising an expression being a function of a plurality of elements, each element relating to data originating from one or more context sources, the service node, in operation, being connectable to the one or more context sources, in which the service node is further arranged to execute the method according to any embodiment of the present invention. For that, the service node may further comprise a rule interpreter for evaluating the expression. Also, the service node may further comprise a context information collector for interfacing with the one or more context sources. The context information collector may in an even further embodiment comprise a context source proxy for each of the one or more context sources, for storing data associated with each respective context source.

With the optimizations described in this invention together the required resources for a service depending on different context sources will be reduced to the minimum without loosing the required performance in terms of latency and cost (in terms of network resources and monetary cost).

BRIEF DESCRIPTION OF THE DRAWINGS

The present invention will be discussed in more detail below, using a number of exemplary embodiments, with reference to the attached drawings, in which.

DETAILED DESCRIPTION

The present invention may be applied and implemented in any type of communication network structure, such as a cellular telecommunication network. The various method embodiments described below may be implemented in one of existing network hardware components or in a separate service node which interfaces with other nodes and/or components in the network 1 as required.

Figure 1:
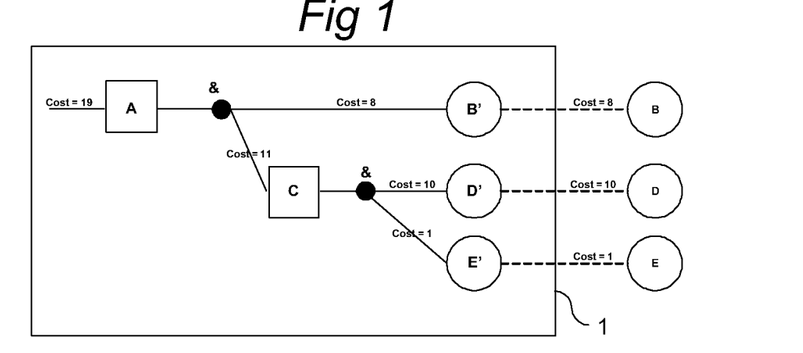
FIG. 1 shows a schematic diagram of a network allowing the evaluation of an expression.

The basic concept of the present invention is illustrated in the network structure representation shown in FIG. 1. Only the elements needed to understand the invention are shown here. An service or application may use a network 1 to obtain the evaluation of an expression A depending on a plurality of elements. Actual context sources B, D, and E (providing data related to context information) may be located outside of the network 1, but are able to communicate with the network 1. E.g., the network 1 may comprise context source proxies (or context source proxy servers) B', D', and E', providing context source information in the network 1.

The network 1 shown in FIG. 1 may represent any kind of service depending on data from context sources B, D and E with certain relations or expressions A and C between them. A request from an application or service depends on the evaluation of an expression A. In the situation shown in FIG. 1, the expression A depends on two elements, i.e. another expression C (intermediate expression) and the value of context source B. The expression C depends on the value of context sources D, E as illustrated in FIG. 1.

Other expressions may also be used in the embodiments of the present invention. Although the expression A illustrated above comprises one further expression (expression C), it is also envisageable that no intermediate expressions are present, i.e. the expression A to be evaluated depends directly on information (data) from one or more context sources B, D, E. Also, more complex expressions may be necessary when implementing certain network services, e.g. comprising multiple intermediate expressions.

Figure 2:
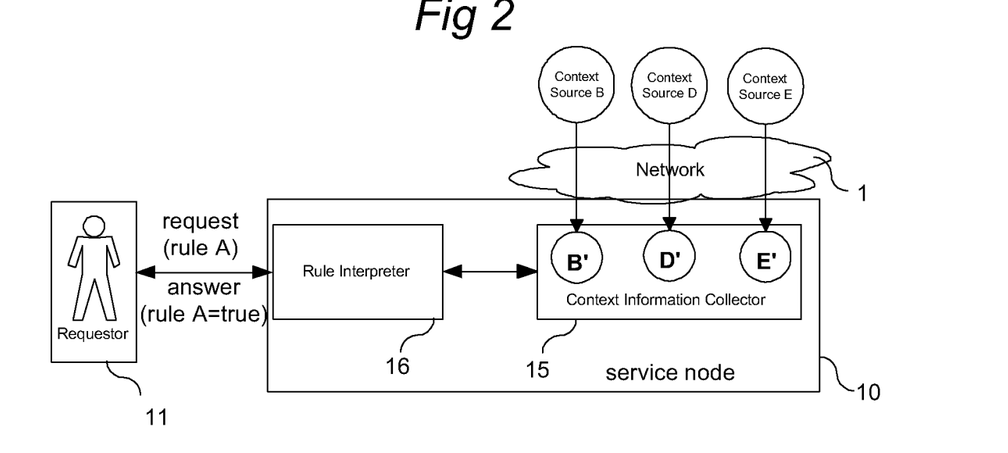
FIG. 2 shows a schematic diagram of a network implementing an embodiment of the present invention.

A possible implementation of the present invention in a telecommunication network is shown in FIG. 2. Again, the context sources B, D and E are shown as being positioned outside the network 1. A requestor 11 (e.g. an application being executed in a mobile telephone operated by a user) may send a request to a service node 10, which service node 10 may be part of the network 1, or, as indicated in FIG. 2, is connected to the network 1. The service node 10 comprises a context information collector 15 connected to the context sources B, D, E through the network 1, and a rule interpreter 16 connected to the context information collector 15 and the requestor 11. The network 1 forms the transport facility of information coming from the physical context sources B, D, E. The physical context sources are positioned outside the service node 10, but are represented within the service node 10 by their respective proxies B', D', E'. The functionalities indicated in FIG. 2 may be implemented as software programs loaded on a processing device which is known as such, e.g. in the form of the service node 10, or another already existing processing device in the network 1. The context source proxies B', D' and E' may be implemented as part of the context information collector 15.

A request (indicated by Request (Rule A) in FIG. 2) is posted at the rule interpreter 16 by the requestor 11. In this case, the request concerns the evaluation of an expression Rule A, which is, as shown in relation to FIG. 1, based on the three context sources B, D and E. The relation between rules and context sources is already outlined in relation to FIG. 1 above. The requestor 11 is notified by the rule interpreter 16 when rule A evaluates to true.

A further aspect playing a role in the embodiments of the present invention is the cost or weight of obtaining information from the context sources B, D, E. The cost of a request illustrates what the actual cost is of a value request for a particular context source B, D, E. The cost is represented by an associated context source weight value determined in terms of network resources (=N) and monetary cost=($€$):

$$\text{weight}=f(N, €).$$

In the embodiment of FIG. 1, the cost or weight are given for the example that the cost(B)=8; cost (D)=10; cost(E)=1. So in order to evaluate the expression A in total, i.e. by interrogating all context sources B, D, and E for information, the expression evaluation weight for the requestor is 19, as indicated in FIG. 1.

Given the structure of the network in which the actual context sources B, D, E, form the end points, a second (naïve) implementation will just request the first context source proxy in the network (which is B', see Fout! Verwijzingsbron niet gevonden. FIG. 2) as first. When assuming that the context source information is a boolean value ('false' or 'true') and that the probability of occurrence of these boolean values is 50%, the cost for first requesting context source B, and only proceeding with interrogating the next context source when the value is true, then the total cost for expression A will lower to 13.25 given the cost for each context source B, D, E in FIG. 1 (cost A=cost B+50% of cost C=cost B+50% (cost D+50% cost E)).

Figure 3:
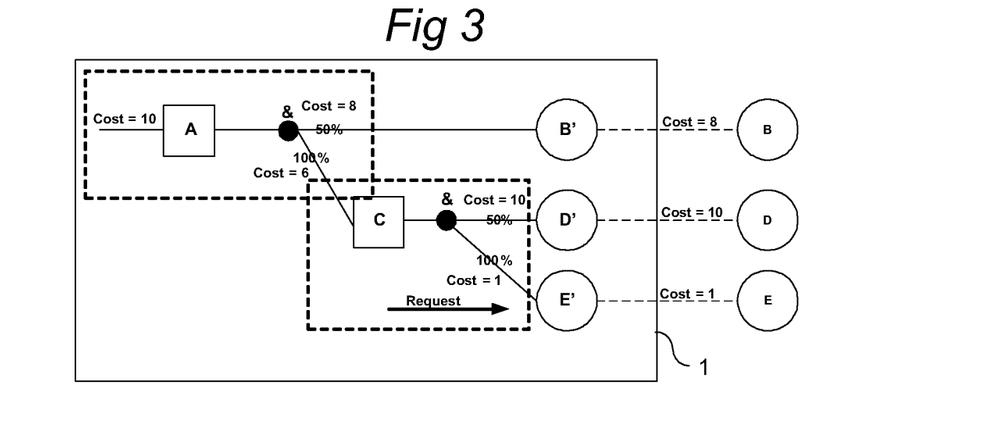
FIG. 3 shows a schematic diagram of a network evaluating an expression according to an embodiment of the present invention.

However, a further improvement is possible according to an embodiment of the present invention when evaluating first the context source B, D, E (or context source proxy B', D', E') for which a lowest expression evaluation weight is determined. This is indicated schematically in the schematic network diagram of FIG. 3. In Fout! Verwijzingsbron niet gevonden. FIG. 3 it is shown that the depending on the cost of request towards each context source proxy B', D', E', it is determined that context source proxy E' will get the first request until it becomes true. This means that neither context source proxy B' nor D' will be requested, which will save (network) resources. In this case, the context source E has the lowest expression evaluation weight: the elements of expression A evaluate to a cost of 8 for context source B, and 6 for expressions C (of which the elements evaluate to costs of 10 (context source D) and 1 (context source E), respectively). By iteratively determining the weight of evaluating (intermediate) expressions A and C until all elements of the farthest intermediate expression relate directly to information from the context sources (D and E in this case for the intermediate expression C), the context source with the lowest expression evaluation weight may be found.

The total cost for evaluating expression A (assuming the same 50% distribution of boolean values) becomes 8 (cost A=cost E+50% (cost D+50% (cost B))). The reason why context sources B and D will count for only 50% each time is due to the fact that in a random division 50% of the time these context sources will be true (or false). This means that 100% of all cases context source proxy E' will be requested, in 50% of all cases context source proxy D', and in 25% of all cases context source proxy B' will be requested which will lead to a lower total cost for expression A.

An example of using this embodiment in a (mobile) telecommunication network is for a particular service, which e.g. only sets up a call when a number of requirements are met. The context source B may indicate whether or not a subscriber is in a geographical location within 5 km of a centre of a town. Context source D may indicate whether or not this particular subscriber is reachable by phone (i.e. mobile phone is on, and no ongoing call is present). Context source E may indicate whether or not the particular subscriber has any appointments at that time in his agenda (e.g. using an Outlook or Exchange program). The cost for obtaining this information may be considerably different.

In a naïve implementation, again, the rule interpreter 16 would first evaluate context source proxy B', if this data is 'true' would then evaluate context source proxy D', and if this data is 'true' would then finally evaluate context source proxy E'. In the implementation according to the present invention, the context source B, D, E with the lowest expression evaluation weight would be interrogated first, and only if evaluating 'true' the context source B, D, E with the next lowest weight would be interrogated, and so forth.

When the cost of obtaining the data from context sources B, D, and E would be the same, this implementation would provide the same cost as the naïve solution. However, when the cost are different, the present implementation is much less costly.

E.g. when the cost of obtaining data from context sources (or proxies) B, D, E, are all 1 Euro (and assuming that the chance of true/false for each of the context sources is 50%/50%), the total cost for evaluating expression A is:

a. naïve evaluation: 1+50%×(1+50%×1)=€ 1.75;

b. lowest weight first implementation: 1+50%×(1+50%×1)=€ 1.75.

When the cost for obtaining data from context source B is 4, from context source D is 2, and from context source E is 1, then the total cost for evaluating expression A is:

a. naïve evaluation: 4+50%×(2+50%×1)=€ 5.25;

b. lowest weight first implementation: 1+50%×(2+50%×4)=€ 3.00.

This example shows that the present implementation provides much lower cost for evaluating an expression, and thus ultimately lower cost for providing this service in the telecommunications network.

Figure 4:
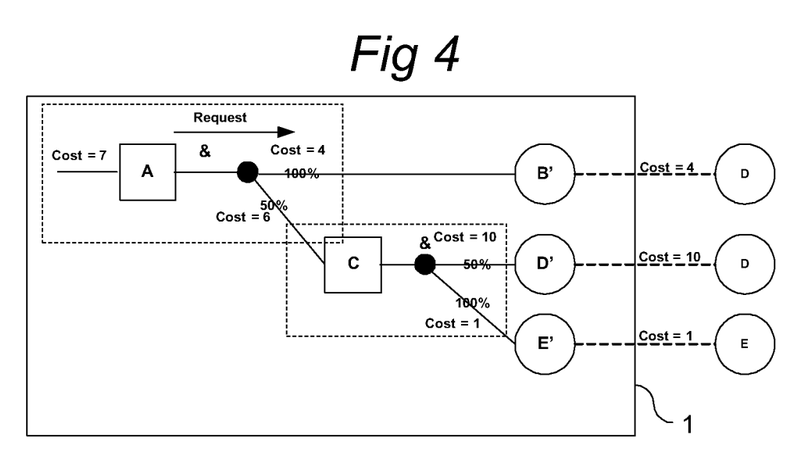
FIG. 4 shows a schematic diagram of a network, in which evaluation of an expression is performed according to a further embodiment of the present invention.

In FIG. 4, a further example is shown using the same expressions A and C as in the above examples, but with a different weight for each of the context sources B, D and E. In this example, cost(B)=4, cost(D)=10 and cost(E)=1. First, it is determined that the cost for the first element of expression A (context source B) is equal to 4. Then the cost for the second element of expression A (sub-expression C) is determined, by evaluating the sub-expression C. The first element of sub-expression C (context source D) is determined to have a larger weight (10 versus 1) than the second element of sub-expression C (context source E), and thus for evaluation of sub-expression C, context source E would have to be interrogated first. This results in a determination of the cost for sub-expression C of 6 (i.e. cost E+50% of cost D, when assuming 50/50 division of probabilities of context source E having a value true). As a total, the cost for evaluating expression A amounts to 7. As the cost for the second element of expression A is larger than the cost for the first element of expression A (6>4), it is determined in this embodiment that the first element (context source B) is to be interrogated first by the service node 10. Only when this context source B evaluates as true, the next candidate is interrogated, which in this case is context source E. Only when also context source E is evaluated as true, the final context source D will be interrogated.

Compared to the naïve solution (first B, then D, and finally E), the cost for evaluation of expression A is again lower:

a. naïve evaluation: 4+50%×(10+50%×1)=€ 9.25;

b. lowest weight first implementation: 4+50%×(1+50%×10)=€ 7.00.

In a further embodiment (absolute lowest weight), the construction of the expression and sub-expression(s) relating to the request of the requestor 11 is not accounted for. This embodiment only looks at the actual cost of obtaining data from a context source. In the above example, this would result in first interrogating context source E (cost=1), then context source B (cost=4) and then context source D (cost=10). In the above given example, this would result in a total cost for evaluating expression A of 7 (cost E+50% cost D+25% cost B), which is still lower than the naïve solution. This embodiment may be achieved when only the associated context source weight for obtaining data from a context source B, D, E, is known. No further calculations are necessary (e.g. related to finding a cheapest path route when the evaluation involves complex intermediate expressions), which may require less resources.

The expression and intermediate expressions as used in the above embodiments and descriptions are functions of boolean elements, having a value of either true or false. In further embodiments, the elements may also comprise functions of numerical values obtained from context sources B, D, E, e.g. to check whether a value of a context source is within a certain range. In actual network implementations, some of the context sources may respond with a value 'unknown' when a value is not available, e.g. in case a cell phone is turned off, or a GPS system does not deliver any information. In most applications this will result in an exception code, which may lead to unavailability of the service.

In a further embodiment, this possibility of a context source providing a value of unknown may be utilised to further improve the efficiency of the network or to reduce cost. In a first variant, it is taken into account that next to the boolean values true and false, a context source B, D, E, may provide the value unknown as response to an interrogation. Depending on the (intermediate) expression to be evaluated, this may result in the finding that it is not necessary to interrogate any further context sources for that request, thus reducing network data traffic and interrogation cost.

In a first example, again the expressions A and C of FIG. 1 is used: intermediate expression C is true when both context sources D and E return a value true, and expression A is true when both context source B and intermediate expression C return a value true. Suppose that context source E is unavailable, then the value of intermediate expression C depends on the value of context source D. After all, when context source D returns false, intermediate expression C will evaluate to false as well, but if the value of context source D is true or unknown, the value of intermediate expression C is unknown. If the value of intermediate expression C is false, there is no need to continue asking for context source B's or E's values, which saves network resources. If the value of intermediate expression C is unknown, context source B must be interrogated.

The following summarizes this as follows

| and | E = true | E = false | E = unknown |
|---|---|---|---|
| D = true | C = true | C = false | C = unknown |
| D = false | C = false | C = false | C = false |
| D = unknown | C = unknown | C = false | C = unknown |

The false cases in the unknown row and column (=bold face) are caught automatically through this invention, which is an extra optimization not taken care of before.

In the next example, the result of this embodiment will be viewed in case of a boolean OR expression. Suppose that both expression A and expression C are boolean or—expressions which return true when at least one of the context sources or child expressions is true, then the same logic applies. When context source D is unknown, then the service should still ask context source E for its value. Suppose that context source E is true, then it does not matter that context source D is unknown. After all, when one of the context sources is true, expression C results in true as well. Then, the condition to have expression C return true is satisfied, and no more network resources need to be wasted. The following table gives an overview of the return values (the case explained above can be mapped on the bold entries):

| or | E = true | E = false | E = unknown |
|---|---|---|---|
| D = true | C = true | C = true | C = true |
| D = false | C = true | C = false | C = unknown |
| D = unknown | C = true | C = unknown | C = unknown |

The true cases in the unknown row and column (=bold face) are caught automatically through this invention, which is an extra optimization not taken care of before.

In a further variant, the context source B, D, E, is first interrogated on availability of the respective value. Only when the context source does not return unknown will it be asked for its value, in the case of booleans, true or false, or in the case of integer range values, the value itself.

If the context source B, D, E, does return unknown, the latest value retained from a previous request can be used as input for the expression A or C.

In an example of this embodiment, for boolean values, each expression and context source contains two options, Availability and Latest. Availability consists of two choices, available and true, or available and false. When the context source value is unknown, the service can look at the latest value retained (Latest), which can also be either true or false. In this way, unknown values are no longer an issue. Unknown values are represented by the two cases in which the Availability is false. The Availability depends on the Latest and Availability values of the children elements (either expressions or context sources). Suppose expression C=A & B. Then the Availability of expression C depends on the Latest and Availability of elements A and B as follows:

Availability(C)=(Availability(A) & Availability(B))
|(Availability(A) & not Latest(A)))
|(Availability(B) & not Latest(B)))

In words, expression C is known, if elements A and B are known (in which case the value of expression C is the value of the boolean AND (A & B), or if element A is available and false (in which case the value of expression C is false) or if element B is available and false (in which case the value of expression C is false).

Figure 5:
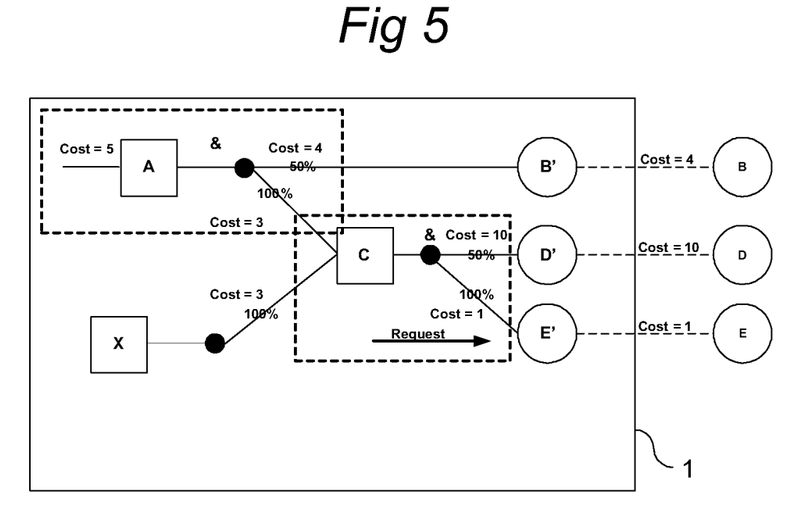
FIG. 5 shows a schematic diagram of a network, in which evaluation of an expression is performed according to a further embodiment of the present invention.

Initially the Latest value can be set to either true or false. As soon as the context source or expression becomes known, the correct value will be set. As long as the Availability is false, the value of Latest should not be used. In FIG. 5, a further possible embodiment is shown in the network 1, in which the expression C (child expression) is shared by expression A and expression X (parent expressions). Expression A is the same as in the embodiment of FIG. 4, and also the associated context source weights are the same (cost(B)=4, cost(D)=10 and cost(E)=1). When the request for evaluation of expression A and expression X are received at the same time from the respective associated requestors 11, the weight for evaluation of expression C may be shared between the two parent expressions A and X. This may result in a different evaluation result when determining which context source is to be interrogated first: In the situation shown in FIG. 5 it is clear that the context source E has the be interrogated first (indicated by the arrow labeled 'Request'), as opposed to the situation described above, where context source B was interrogated first.

Figure 6:
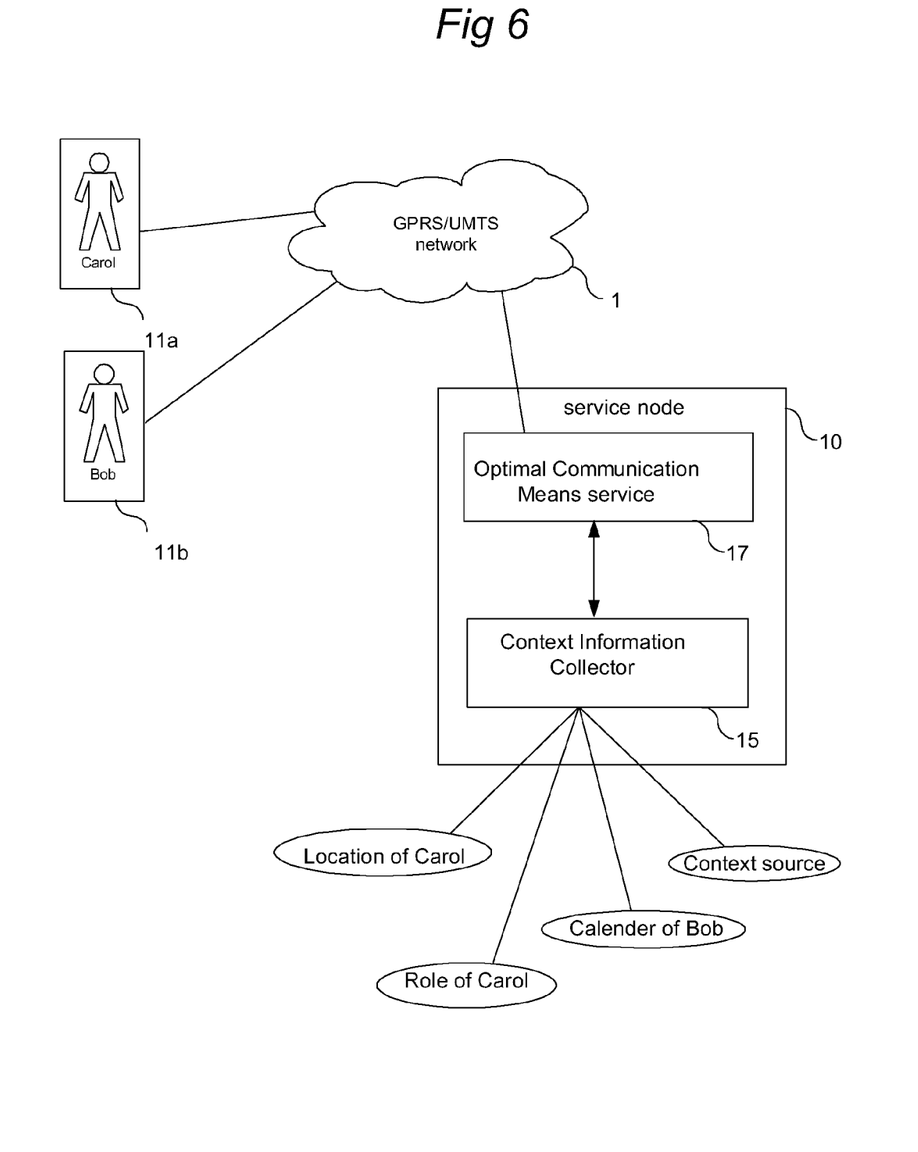
FIG. 6 shows a schematic diagram of a further possible scenario in a communication network using an embodiment of the present invention.

In FIG. 6, a further illustrative example of a possible network architecture is shown for providing a service dependent on the data of more than one context source. In this example, there are two requestors 11a (Carol) and 11b (Bob), which are connected to a GPRS/UMTS network 1. The GPRS/UMTS network 1 is connected to a service node 10, which is arranged to provide an Optimal Communication Means (OCM) service, e.g. implemented as an application 17 in the service node 10. The service node 10 further comprises a Context Information Collector (CIC) 15, which is arranged to interface with a number of context sources.

Carol and Bob are subscribed to the 'Optimal Communication Means Service' and have defined a profile with the preferences they have upon optimal communication means in specific situations. These preferences are stored by the OCM service 17, e.g. in a database (not shown). This means that the profile of Bob is used to decide upon the list of communication means presented to Carol when he/she tries to communicate with Bob.

Carol is in her car and is trying to reach Bob who is at work in a meeting. Bob has defined in his profile that he can be reached by Instant Messaging, SMS or voice mail while in a meeting. Carol has defined in her profile that she can only use voice communication while driving a car.

Carol selects Bob from the contact list. The OCM service 17 retrieves the applicable context from both Carol and Bob through the CIC 15. The OCM service 17 discovers that because of the context of Carol and Bob there is no communication means available at this very moment and presents this through a voice message to Carol (via GPRS/UMTS network 1). The OCM service 17 also gives Carol the choice of contacting her as soon as Bob becomes available. Carol decides that she wants to contact Bob through a voice call as soon as Bob becomes available.

As soon as Bob's meeting has ended his context changes in such a way that he is reachable through voice. The OCM service 17 decides to contact Carol and Carol can decide to call Bob. The following context sources are applicable in this scenario:

Calendar info (Bob): To determine in-meeting for instance;
Role (Carol): To determine in-car situation;
Location (Carol): To determine speed.

The various method embodiments may also be used in this example, i.e. to determine which context source is to be interrogated first based on the cost of evaluating the expression used by the OCM service 17.

The above described embodiments and examples are not meant to limit the scope of protection of the present application, which is defined by the features as described in the appended claims.

The invention claimed is:

1. A method implemented by a node for providing a service in a communication network, the method comprising the steps of:
    receiving a request;
    evaluating the request, wherein the request comprises an expression, the expression being a function of a plurality of elements, each element relating to data originating from one or more context sources available in the communication network, each of the one or more context sources having an associated context source weight for a query by the service;
    determining one context source from the one or more context sources for which an evaluation of the expression has a lowest expression evaluation weight, based on the associated context source weights for querying by the service,
    interrogating first the one context source determined to have the lowest expression evaluation weight; and
    wherein the expression comprises one or more intermediate expressions, the method further comprising iteratively determining a weight of evaluating the one or more intermediate expressions, until all elements relate only to data originating from the one or more context sources, wherein a lowest weight intermediate expression towards each of the context sources is determined for the expression until the expression elements comprise only context sources, at which point the context source to be interrogated first has been determined.

2. The method according to claim 1, in which the method further comprises taking into account the distribution of possible values of the data originating from the one or more context sources when determining the lowest expression evaluation weight.

3. The method according to claim 1, in which the context source having the lowest associated context source weight is determined to have the lowest expression evaluation weight.

4. The method according to claim 1, in which the associated context source weight is a function of network resource use, actual monetary cost, or a combination of network resource use and actual monetary cost.

5. The method according to claim 1, in which the data of each one of the plurality of context sources is stored in an associated proxy server accessible for the service.

6. The method according to claim 1, in which the expression is a boolean function, the data from each of the context sources being true or false.

7. The method according to claim 1, in which the data from the context sources is a numeric value, and the expression comprises a function of the values of the context sources.

8. The method according to claim 6, in which the value of the data from each of the context sources is unknown.

9. The method according to claim 8, in which the method further comprises using a latest obtained value for the respective context source value if the value is unknown.

10. The method according to claim 1, in which a child expression is used by multiple parent expressions, and the weight for evaluating the child expression is shared between the multiple parent expressions when the associated requests are received simultaneously.

11. A service node for a communication network providing a service in the communication network, the service node, in operation, connected to one or more context sources, in which the service node is arranged for:
    receiving a request;
    evaluating the request, wherein the request comprises an expression, the expression being a function of a plurality of elements, each element relating to data originating from one or more context sources available in the communication network, each of the one or more context sources having an associated context source weight for a query by the service;
    determining one context source from the one or more context sources for which evaluation of the expression has a lowest expression evaluation weight, based on the associated context source weights for querying by the service,
    interrogating first the one context source determined to have the lowest expression evaluation weight; and
    wherein the expression comprising one or more intermediate expressions, the node is further arranged for iteratively determining a weight of evaluating the one or more intermediate expressions, until all elements relate only to data originating from the one or more context sources, wherein a lowest weight intermediate expression towards each of the context sources is determined for the expression until the expression elements comprise only context sources, at which point the context source to be interrogated first has been determined.

12. The service node according to claim 11, in which the service node comprises a rule interpreter for evaluating the expression.

13. The service node according to claim 11, in which the service node comprises a context information collector for interfacing with the one or more context sources.

14. The service node according to claim 13, in which the context information collector comprises a context source proxy for each of the one or more context sources, for storing data associated with each respective context source.

15. The node according to claim 12, the node further comprising means for taking into account the distribution of possible values of the data originating from the one or more context sources when determining the lowest expression evaluation weight.

16. The node according to claim 11, in which the context source having the lowest associated context source weight is determined to have the lowest expression evaluation weight.

17. The node according to claim 11, in which the associated context source weight is a function of network resource use, actual monetary cost, or a combination of network resource use and actual monetary cost.

18. The node according to claim 11, in which the data of each one of the plurality of context sources is stored in an associated proxy server accessible for the service.

19. The node according to claim 11, in which the expression is a boolean function, the data from each of the context sources being true or false.

20. The node according to claim 11, in which the data from the context sources is a numeric value, and the expression comprises a function of the values of the context sources.

21. The node according to claim 19, in which the value of the data from each of the context sources is unknown.

22. The node according to claim 21, further comprising means for using a latest obtained value for the respective context source value if the value is unknown.

23. The method according to claim 1, in which the associated context source weight is a function of a combination of network resource use and actual monetary cost.

24. The node according to claim 11, in which the associated context source weight is a function of a combination of network resource use and actual monetary cost.

25. A method implemented by a node for providing a service in a communication network, the method comprising the steps of:
receiving a request from a mobile telephone;
evaluating the request, wherein the request comprises an expression, the expression being a function of a plurality of elements, each element relating to data originating from one or more context sources available in the communication network, each of the one or more context sources having an associated context source weight for a query by the service;
determining one context source from the one or more context sources for which an evaluation of the expression has a lowest expression evaluation weight, based on the associated context source weights for querying by the service, and
interrogating first the one context source determined to have the lowest expression evaluation weight;
if the first context source provides data that is a true result of the request then interrogating the next context source which has the next lowest expression evaluation weight and if the first context source provides data that is a false result of the request then do not interrogate the remaining context sources and servicing the request if all the interrogated context sources provide data that gives true results; and
wherein the expression comprises one or more intermediate expressions, the method further comprising iteratively determining a weight of evaluating the one or more intermediate expressions, until all elements relate only to data originating from the one or more context sources, wherein a lowest weight intermediate expression towards each of the context sources is determined for the expression until the expression elements comprise only context sources, at which point the context source to be interrogated first has been determined.

26. A service node for a communication network providing a service in the communication network, the service node, in operation, connected to one or more context sources, in which the service node is arranged for:
receiving a request from a mobile telephone;
evaluating the request, wherein the request comprises an expression, the expression being a function of a plurality of elements, each element relating to data originating from one or more context sources available in the communication network, each of the one or more context sources having an associated context source weight for a query by the service;
determining one context source from the one or more context sources for which an evaluation of the expression has a lowest expression evaluation weight, based on the associated context source weights for querying by the service, and
interrogating first the one context source determined to have the lowest expression evaluation weight;
if the first context source provides data that is a true result of the request then interrogating the next context source which has the next lowest expression evaluation weight and if the first context source provides data that is a false result of the request then do not interrogate the remaining context sources and servicing the request if all the interrogated context sources provide data that gives true results; and
wherein the expression comprising one or more intermediate expressions, the service node is further arranged for iteratively determining a weight of evaluating the one or more intermediate expressions, until all elements relate only to data originating from the one or more context sources, wherein a lowest weight intermediate expression towards each of the context sources is determined for the expression until the expression elements comprise only context sources, at which point the context source to be interrogated first has been determined.

27. A method implemented by a node for providing a service in a communication network, the method comprising the steps of:
receiving a request which comprises an expression, the expression being a function of a plurality of elements, each element relating to data originating from one or more context sources available in the communication network, each of the one or more context sources having an associated context source weight for a query by the service;
evaluating the request, wherein determining one context source from the one or more context sources for which an evaluation of the expression has a lowest expression evaluation weight, based on the associated context source weights for querying by the service,
interrogating first the one context source determined to have the lowest expression evaluation weight; and
if the interrogated one context source provides data that does not enable a result for the expression then interrogating the next context source which has the next lowest expression evaluation weight,
if the interrogated one context source provides data that establishes a result for the expression then do not interrogate the remaining context sources; and
wherein the expression comprises one or more intermediate expressions, the method further comprising iteratively determining a weight of evaluating the one or more intermediate expressions, until all elements relate only to data originating from the one or more context sources, wherein a lowest weight intermediate expression towards each of the context sources is determined for the expression until the expression elements comprise only context sources, at which point the context source to be interrogated first has been determined.

28. A service node for a communication network providing a service in the communication network, the service node, in operation, connected to one or more context sources, in which the service node is arranged for:
receiving a request which comprises an expression, the expression being a function of a plurality of elements, each element relating to data originating from one or more context sources available in the communication network, each of the one or more context sources having an associated context source weight for a query by the service;
evaluating the request, wherein determining one context source from the one or more context sources for which an evaluation of the expression has a lowest expression evaluation weight, based on the associated context source weights for querying by the service, interrogating first the one context source determined to have the lowest expression evaluation weight; and if the interrogated one context source provides data that does not enable a result for the expression then interrogating the next context source which has the next lowest expression evaluation weight, and if the interrogated one context source provides data that establishes a result for the expression then do not interrogate the remaining context sources; and wherein the expression comprising one or more intermediate expressions, the service node is further arranged for iteratively determining a weight of evaluating the one or more intermediate expressions, until all elements relate only to data originating from the one or more context sources, wherein a lowest weight intermediate expression towards each of the context sources is determined for the expression until the expression elements comprise only context sources, at which point the context source to be interrogated first has been determined.

\* \* \* \* \*

UNITED STATES PATENT AND TRADEMARK OFFICE
CERTIFICATE OF CORRECTION

Page 1 of 1

PATENT NO. : 8,661,074 B2
APPLICATION NO. : 12/439987
DATED : February 25, 2014
INVENTOR(S) : Hendriks et al.

It is certified that error appears in the above-identified patent and that said Letters Patent is hereby corrected as shown below:

In the Drawings

Fig. 1, Drawing Sheet 1 of 3, delete "Fig" and insert -- Fig. --, therefor at each occurrence throughout the figures.

In the Specification

Column 3, Line 30, delete "An service" and insert -- A service --, therefor.

In the Claims

Column 10, Line 50, Claim 15, delete "The node" and insert -- The service node --, therefor.

Column 10, Line 55, Claim 16, delete "The node" and insert -- The service node --, therefor.

Column 10, Line 58, Claim 17, delete "The node" and insert -- The service node --, therefor.

Column 10, Line 62, Claim 18, delete "The node" and insert -- The service node --, therefor.

Column 10, Line 65, Claim 19, delete "The node" and insert -- The service node --, therefor.

Column 11, Line 1, Claim 20, delete "The node" and insert -- The service node --, therefor.

Column 11, Line 4, Claim 21, delete "The node" and insert -- The service node --, therefor.

Column 11, Line 6, Claim 22, delete "The node" and insert -- The service node --, therefor.

Column 11, Line 12, Claim 24, delete "The node" and insert -- The service node --, therefor.

Signed and Sealed this
Seventeenth Day of February, 2015

Michelle K. Lee
*Deputy Director of the United States Patent and Trademark Office*